United States Patent [19]

Pav et al.

[11] Patent Number: 4,729,153

[45] Date of Patent: Mar. 8, 1988

[54] ROLL FOR USE IN CALENDERS AND THE LIKE

[75] Inventors: Josef Pav; Richard Rauf, both of Krefeld; Hans-Dieter Patermann, Willich, all of Fed. Rep. of Germany

[73] Assignee: Kleinewefers GmbH, Krefeld, Fed. Rep. of Germany

[21] Appl. No.: 860,664

[22] Filed: May 7, 1986

[30] Foreign Application Priority Data

May 8, 1985 [DE] Fed. Rep. of Germany ....... 3516535

[51] Int. Cl.$^4$ .............................................. B21B 13/00
[52] U.S. Cl. ............................. 29/116 AD; 29/113 R; 29/113 AD; 29/116 R; 100/163 A; 100/170
[58] Field of Search ......... 29/113 R, 113 AD, 116 R, 29/116 AD, 130; 100/162 B, 162 R, 163 R, 163 A, 164, 168, 170; 162/281, 287

[56] References Cited

U.S. PATENT DOCUMENTS

| | | | |
|---|---|---|---|
| 3,997,953 | 12/1976 | Christ et al. | 29/116 AD |
| 4,074,624 | 2/1978 | Biörnstad et al. | 29/116 AD |
| 4,154,160 | 5/1979 | Küsters | 29/116 AD |
| 4,222,324 | 9/1980 | Biondetti | 29/116 AD |
| 4,233,011 | 11/1980 | Bolender et al. | 29/116 AD |
| 4,282,638 | 8/1981 | Christ et al. | 29/116 AD |
| 4,282,639 | 8/1981 | Christ et al. | 29/116 AD |
| 4,328,744 | 5/1982 | Pav et al. | 100/162 B |
| 4,389,932 | 6/1983 | Pav | 100/162 B |
| 4,389,933 | 6/1983 | Pav | 100/162 B |
| 4,394,793 | 7/1983 | Pav et al. | 29/116 AD |
| 4,432,277 | 2/1984 | Hartmann | 29/116 AD |
| 4,480,537 | 11/1984 | Agronin et al. | 29/116 AD |
| 4,498,383 | 2/1985 | Pav et al. | 29/116 AD |
| 4,509,237 | 4/1985 | Volz et al. | 29/113 AD |
| 4,520,723 | 6/1985 | Pav et al. | 100/162 B |

*Primary Examiner*—P. W. Echols
*Assistant Examiner*—Irene Graves Golabi
*Attorney, Agent, or Firm*—Peter K. Kontler

[57] ABSTRACT

A calender roll wherein the flexible shell is supported by a row of primary hydrostatic bearing elements serving to transmit first forces toward the nip of such roll with a second roll and wherein the shell is further acted upon by a row of secondary hydrostatic bearing elements which generate second forces opposing the first forces. The rate of fluid flow through the secondary bearing elements is regulated with a view to conform the temperature of the shell along the nip of the two rolls to a preselected pattern. To this end, the compensator of a computer in the fluid pressure regulating unit insures that pressure changes are distributed among the primary and secondary bearing elements with a view to match each change of the first forces by an equal change of the second forces. The temperature of the fluid is regulated only ahead of the regulating unit. The compensator cooperates with the secondary bearing elements to ensure that the temperature of the shell can be changed along the nip without altering the temperature of the fluid.

19 Claims, 6 Drawing Figures

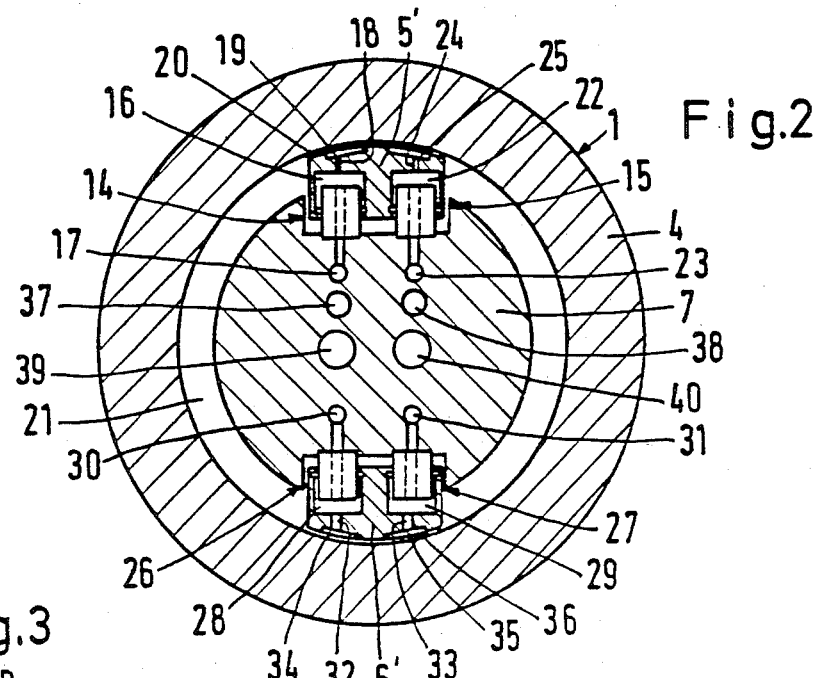
Fig.2
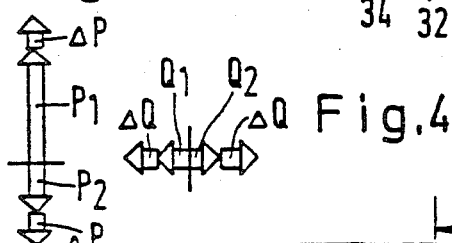
Fig.3
Fig.4
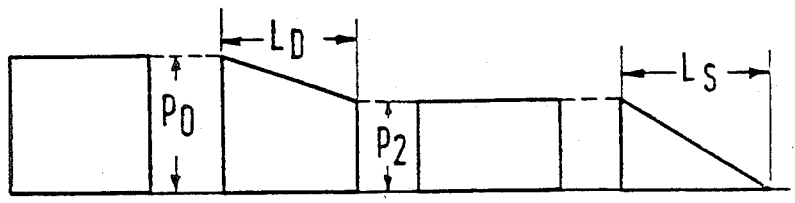
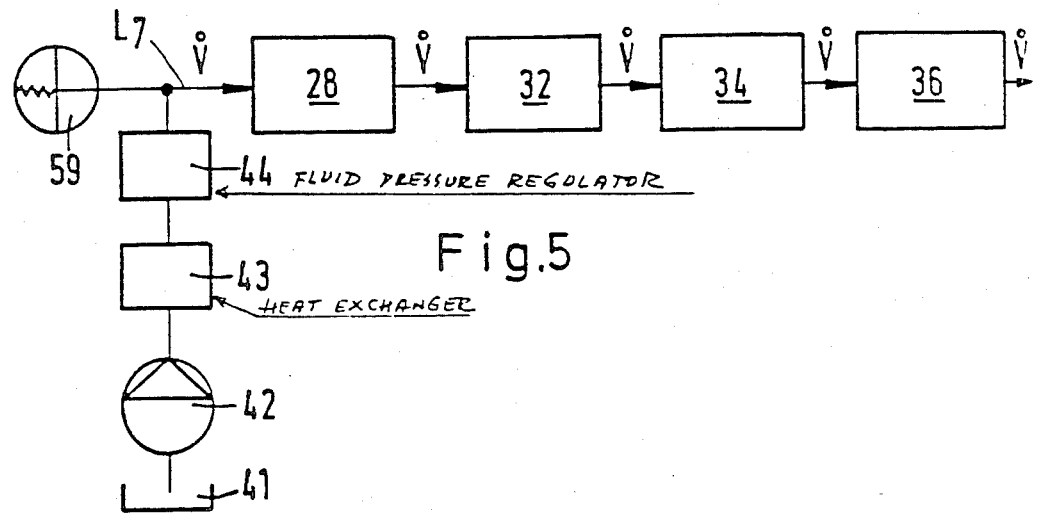
Fig.5

ROLL FOR USE IN CALENDERS AND THE LIKE

BACKGROUND OF THE INVENTION

The present invention relates to rolls which can be used in calenders and analogous machines to treat running webs or sheets of paper, textile material, plastic foil and the like. The invention also relates to assemblies of rolls which can be used in such machines and wherein at least one roll has a floating shell which surrounds a stationary carrier.

It is known to provide a calender roll with a flexible hollow cylindrical shell which floats on one or more rows of hydrostatic bearing elements supported by a stationary beam-like carrier and defines with an adjacent roll an elongated nip for the running web. The hydrostatic bearing elements receive pressurized fluid from a regulating unit whose operation is controlled by signals denoting the pressures at various locations along the nip. As a rule, each bearing element comprises at least one pressure transmitting unit having a plunger which defines with the carrier (or with a part on the carrier) a cylinder chamber receiving pressurized hydraulic fluid from a regulator and communicating with an external pocket of the plunger by a flow restricting passage. Pressurized fluid which enters the pocket leaks along the internal surface of the shell and prevents the shell from coming into direct metal-to-metal contact with the plunger. The forces which are generated by such pressure transmitting units are directed toward the nip, and the pressure of hydraulic fluid which flows into the cylinder chambers of discrete pressure transmitting units, into the cylinder chambers of several pressure transmitting units in a given bearing element, or into the cylinder chambers of one or more pressure transmitting units in two or more bearing elements is regulatable individually so as to allow for the establishment of a predetermined pattern of pressures along the nip.

It is also known to equip a roll of the just outlined character with means for regulating the temperature of the hydraulic fluid, i.e., for withdrawing heat or for admitting heat, depending on the monitored temperature of such fluid. It is further known to regulate the quantity of heat which is transmitted between the shell and the pressurized hydraulic fluid. Reference may be had to German Offenlegungsschrift No. 24 20 324 which discloses a roll that is particularly suited for the treatment of running paper webs in calenders and like machines. The roll comprises a row of hydrostatic bearing elements which are mounted on the carrier opposite the nip for the paper web. Groups of neighboring bearing elements receive pressurized hydraulic fluid by way of common conduits which, in turn, receive pressurized fluid from adjustable valves in the regulating unit. The pressure of fluid streams flowing through the valves is regulated with a view to establish a desired distribution of pressures along the nip. The entire body of hydraulic fluid is heated in a heat exchanger and each conduit contains an auxiliary heater which renders it possible to alter the temperature of fluid flowing to the corresponding group of bearing elements. The auxiliary heaters contribute to the complexity as well as to the initial and maintenance cost of the roll. Moreover, the ability of the auxiliary heaters to influence the temperature of the roll is rather limited because a synthetic oil cannot be heated beyond 240° C. and the quantity of oil which can be delivered to the bearing elements per unit of time is limited by the pressure regulating unit whose primary function is to select the pressure along the nip.

German Pat. No. 25 03 051 discloses a roll wherein the heating action upon the shell is independent of the pressure regulating action, i.e., of the supporting action of bearing elements upon the shell. In accordance with the teaching of this patent, the carrier supports an additional set of (secondary) bearing elements which are mounted diametrically opposite the (primary) bearing elements for regulation of the pressure along the nip and receive a suitable heating fluid which is to influence the temperature of the shell. The secondary bearing elements are similar to the primary bearing elements and the heating fluid which is fed to the secondary bearing elements is or can be identical with the fluid which is supplied to the primary bearing elements. The main difference is that the fluid which is supplied to the secondary bearing elements is maintained at a different pressure as well as at a different temperature. Moreover, the mutual spacing of secondary bearing elements is greater than that of the primary bearing elements.

Commonly owned U.S. Pat. No. 4,520,723 to Pav et al. discloses a roll wherein a rotary flexible shell surrounds a stationary carrier and a set of primary bearing elements is used jointly with a set of secondary bearing elements which are offset with reference to the primary bearing elements in the circumferential direction of the shell. At least one component of force which is generated by each primary bearing elements acts counter to the direction of the force which is applied to the shell in the nip of such shell with a second roll. The forces which are generated by the secondary bearing elements have components acting counter to the action of forces which are generated by the primary bearing elements, i.e., in the direction of the force acting in the nip and tending to move the corresponding portion of the shell nearer to its carrier. If each of the primary and secondary bearing elements comprises a pair of neighboring pressure transmitting units (note, for example, FIG. 2 of Pav et al.), each such bearing element further generates a force acting transversely of the direction of action of the aforediscussed components, i.e., at right angles to a plane including the axis of the roll and the nip which the shell of such roll defines with a neighboring roll. The patented arrangement entails a desirable stabilization of the shell by preventing it from yielding to externally applied transverse forces.

Commonly owned U.S. Pat. No. 4,394,793 discloses a roll with hydrostatic bearing elements each of which comprises two pressure transmitting units. German Pat. No. 29 02 956 discloses a roll with several heaters for the hydraulic fluid. Commonly owned U.S. Pat. No. 4,328,744 discloses rolls wherein each primary and each secondary bearing element can comprise two or more pressure transmitting units.

OBJECTS AND SUMMARY OF THE INVENTION

An object of the invention is to provide a novel and improved roll which can be used in calenders and like machines and is constructed and assembled in such a way that the temperature of its shell at several locations longitudinally of the nip can be varied without changing the temperature of the hydraulic fluid.

Another object of the invention is to provide a machine which embodies the above outlined roll.

A further object of the invention is to provide novel and improved means for regulating the flow of hydraulic fluid into and in the pressure applying units of hydrostatic bearing elements between the carrier and the shell of the above outlined roll.

An additional object of the invention is to provide a roll wherein the forces which are applied to maintain the pressure along the nip at a selected value can be varied independently of the regulation of temperature along the nip and vice versa.

Still another object of the invention is to provide a roll wherein the temperature of the fluid which is used to regulate and maintain the pressure along the nip of the roll with a second roll need not be changed in order to change the temperature of the peripheral surface of the shell along the nip, and wherein a single fluid medium suffices to ensure predictable and accurate regulation of pressures along the nip as well as predictable and accurate regulation of temperatures of the shell along the nip.

An additional object of the invention is to provide a novel and improved method of simultaneously regulating the pressure as well as the temperature along the nip of two neighboring rolls in a calender or a like machine.

The invention resides in the provision of a pressure applying roll which can be used in calenders or analogous machines to define with a complementary roll an elongated nip for the passage of a running web consisting of paper, textile material, plastic foil or the like. The improved roll comprises a hollow flexible rotary cylindrical shell, an elongated carrier which is non-rotatably mounted in the frame of the machine and extends through and is spacedly surrounded by the shell, hydrostatic bearing means interposed between the shell and the carrier and including (a) at least one row of first fluid-operated bearing elements extending longitudinally of the carrier and shell and serving to apply to the internal surface of the shell a first substantially radial force acting in a first direction (particularly against the nip) and (b) at least one row of second fluid-operated bearing elements extending longitudinally of the carrier and shell and serving to apply to the shell a second radial force having a component acting in a second direction counter to the first direction, a source of pressurized hydraulic fluid including means for tempering the fluid, and means for conveying pressurized fluid from the source to the bearing elements and for simultaneously regulating the temperature of the shell at a plurality of locations spaced apart from each other in the longitudinal direction of the nip by regulating the rate of fluid flow to the bearing elements as a function of pressure changes (i.e., the regulating means alters the temperature at a selected location by changing the rate of fluid flow to the nearest bearing element or elements). The regulating means comprises compensator means which is operative to distribute the pressure changes among the first and second bearing elements so that the resulting changes of the first force match or closely approximate the resulting changes of the second force.

Each bearing element preferably comprises a plurality of pressure transmitting units (e.g., two pressure transmitting units) which are adjacent each other in the circumferential direction of the shell so that each bearing element further applies to the shell two oppositely directed transverse forces acting substantially at right angles to the first force or the aforementioned component of the second force. The compensator means comprises means for distributing the pressure changes among the first and second bearing elements so that the resulting changes of one of the two oppositely directed transverse forces at least approximate the resulting changes of the other of the oppositely directed transverse forces.

Each first bearing element is or can be disposed diametrically opposite a second bearing element, i.e., such bearing elements can be disposed in a common plane including the axis of the shell. In accordance with a presently preferred embodiment of the invention, each bearing element comprises two pressure transmitting units disposed at the opposite sides of a symmetry plane including the axis of the shell.

The conveying means can comprise an outlet which delivers pressurized fluid to all of the second bearing elements. Alternatively, the second bearing elements can be assembled into a plurality of groups and the conveying means then comprises a discrete outlet for each group of second bearing elements.

Each pressure transmitting unit of each bearing element has a throttling passage which can admit fluid from a cylinder chamber to a pocket of the respective unit. The arrangement is preferably such that the resistance of throttling passages in the pressure transmitting units of the first bearing elements to the flow of fluid therethrough is greater than the resistance of throttling passages in the pressure transmitting units of the second bearing elements. This can be achieved by selecting the cross-sectional areas of throttling passages in the pressure transmitting units of the second bearing elements in such a way that they exceed the cross-sectional areas of throttling passages in the pressure transmitting units of the first bearing elements. The arrangement is preferably such that the rate of fluid flow through the throttling passages of pressure transmitting units of the second bearing elements is at least 1.5 times (and preferably more than two times) the rate of fluid flow through the throttling passages of pressure transmitting units of the first bearing elements.

The improved roll preferably further comprises means for monitoring the temperature of the shell at a plurality of locations longitudinally of the nip of the two rolls and for transmitting to the comparator means first signals which denote the temperatures of the shell at the respective locations. The comparator means comprises means (e.g., suitable signal comparing stages) for comparing the signals from the monitoring means with second (reference) signals denoting the desired temperatures of the shell at the aforementioned locations. The comparator means is arranged to alter the rate of fluid flow to the bearing elements which are adjacent to those locations where the monitored temperatures deviate from desired temperatures.

The regulating means preferably comprises a computer which includes the comparator means.

The improved roll can be further provided with means (e.g., one or more pumps) for increasing the pressure of fluid flowing to the first bearing elements. Each pump of such pressure increasing means can be arranged to deliver pressurized fluid to a set or group of first bearing elements, e.g., to one-half of the total number of first bearing elements.

The number of first bearing elements can match the number of second bearing elements.

The aforementioned source can comprise a reservoir and means for returning leak fluid from the interior of the shell into the reservoir. The conveying means can comprise at least one conduit which connects the reservoir with the regulating means and a fluid flow machine (e.g., an ordinary pump) in the conduit means. The tempering means can comprise at least one heat exchanger in the conduit means downstream of the fluid flow machine and means for controlling the temperature of the medium which exchanges heat with pressurized fluid flowing in the conduit from the reservoir to the regulating means. The regulating means can comprise a plurality of discrete sections each of which includes means for regulating the pressure of fluid flowing to a predetermined number of first bearing elements. Alternatively, the regulating means can comprise a plurality of first sections each of which regulates the pressure of fluid flowing to a predetermined number of first bearing elements, and at least one second section which serves to regulate the pressure of fluid flowing to the second bearing elements. The carrier can be provided with a plurality of channels for circulation of fluid to and from the bearing elements The novel features which are considered as characteristic of the invention are set forth in particular in the appended claims. The improved roll itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged transverse sectional view of the improved roll;

FIG. 3 is a diagram of forces acting upon the shell of the roll in a plane which includes the axis of the roll and the nip of such roll with an adjoining roll;

FIG. 4 is a similar diagram of forces acting transversely of the just mentioned plane;

FIG. 5 is a diagram showing the variations of pressure in a fluid stream flowing through a pressure transmitting unit of a secondary bearing element.

DESCRIPTION OF THE PREFERRED EMBODIMENTS

Figure 1:
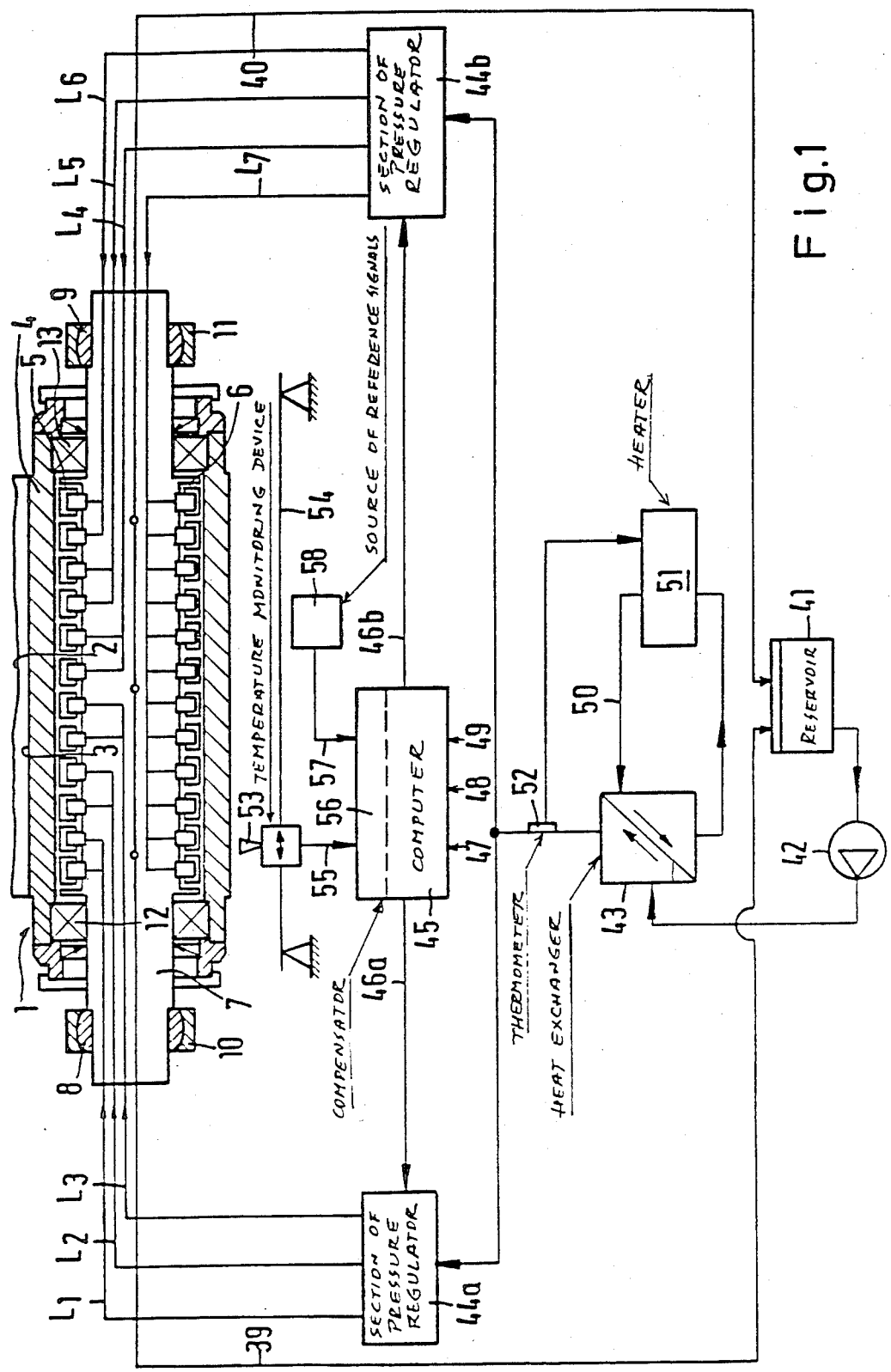
FIG. 1 is a schematic axial sectional view of a roll which embodies one form of the invention and a block diagram of the source of fluid and of means for regulating the pressure of fluid which is admitted to the primary and secondary bearing elements.

FIG. 1 shows a first roll 1 and a second roll 2. The roll 1 has a stationary elongated carrier 7 which is spacedly surrounded by a hollow flexible rotary cylindrical shell 4. The shell 4 and the roll 2 define an elongated nip 3 for the passage of a running web of paper, plastic foil, textile material or the like.

The roll 1 further comprises hydrostatic bearing means having a first bearing unit with a row of twelve equidistant fluid-operated primary or first bearing elements 5 and a second bearing unit with a row of twelve equidistant fluid-operated secondary or second bearing elements 6. The two rows extend in the longitudinal direction of the carrier 7 and shell 4 and are disposed diametrically opposite each other (see FIG. 2). The end portions of the carrier 7 are non-rotatably mounted in spherical bearings 8 and 9 which are installed in stationary frame members 10, 11 at the respective axial ends of the rolls 1 and 2. The end portions of the shell 4 contain antifriction bearings 12, 13 which surround the respective portions of the carrier 7. The bearings 12, 13 can be omitted if the end portions of the shell 4 are mounted for movement radially of the carrier 7, for example, in a manner as disclosed in the aforementioned commonly owned U.S. Pat. No. 4,520,723.

As shown in FIG. 2, each bearing element 5 comprises two pressure transmitting units or devices 14 and 15 which are spaced apart from each other in the circumferential direction of the shell 4. The pressure transmitting device 14 has a cylinder chamber 16 which can receive pressurized hydraulic fluid by way of a channel 17 in the carrier 7 and communicates with a pocket 19 by way of a throttling passage 18. The pocket 19 is formed in the convex surface of a plunger or shoe 5' which is common to the pressure transmitting devices 14, 15 of the respective bearing element 5 and is separated from the adjacent portion of the cylindrical internal surface of the shell 4 by a narrow clearance or gap 20 allowing some hydraulic fluid to leak into the space 21 between the carrier 7 and the shell 4.

The other pressure transmitting device 15 of each bearing element 5 comprises a cylinder chamber 22 which receives pressurized hydraulic fluid from a channel 23 in the carrier 7 and communicates with a second pocket 25 of the respective plunger or shoe 5' by way of a throttling passage 24. Hydraulic fluid which leaks from the pocket 25 is gathered in the space 21.

Each secondary bearing element 6 comprises a pair of pressure transmitting units or devices 26, 27 having a common plunger or shoe 6' with two pockets 34, 35 which are spaced apart from each other in the circumferential direction of the shell 4. The pressure transmitting devices 26, 27 respectively comprise the aforementioned pockets 34, 35, discrete cylinder chambers 28, 29 in the common plunger 6', channels 30, 31 which are provided in the carrier 7 and serve to deliver a pressurized hydraulic fluid to the chambers 28, 29, respectively, and throttling passages 32, 33 which connect the chambers 28, 29 with the pockets 34, 35, respectively. The reference character 36 denotes one of the clearances or gaps which establish paths for the flow of leak fluid from the pockets 34, 35 into the space 21 within the confines of the shell 4. Channels 37, 38 in the carrier 7 deliver pressurized fluid to other bearing elements 5 and 6. Channels 39 and 40 in the carrier 7 return the collected leak fluid from the space 21 into a reservoir 41 (FIG. 1) forming part of a source of pressurized hydraulic fluid.

A fluid flow machine 42 (e.g., a standard pump) draws fluid from the reservoir 41 and conveys the withdrawn fluid through a tempering device including a heat exchanger 43 and thence to the two sections 44a, 44b of a composite fluid pressure regulating unit 44. The section 44a has three outlets $L_1$, $L_2$, $L_3$ each of which supplies pressurized fluid to a pair of neighboring primary bearing elements 5. The remaining three pairs of bearing elements 5 receive pressurized fluid from the outlets $L_4$, $L_5$ and $L_6$ of the section 44b of the pressure regulating unit 44. A single fourth outlet $L_7$ of the section 44b supplies pressurized fluid to all twelve secondary bearing elements 6. For example, the outlet $L_1$ can deliver pressurized fluid to the channels 17, 23 of FIG. 2, the outlets $L_2$ to $L_6$ can deliver pressurized fluid to the channels 37, 38, and the outlet $L_7$ delivers pressurized fluid to the channels 30, 31 of FIG. 1. The construction of the sections 44a, 44b of the pressure regulating unit 44 is such that each of the outlets $L_1$ to $L_7$ can receive hydraulic fluid at a different pressure. This is disclosed, for example, in commonly owned U.S. Pats. Nos. 4,389,932 and 4,389,933.

In the embodiment of FIGS. 1 and 2, the pressure regulating unit 44 further comprises a computer 45 having three inputs 47, 48, 49 and two outputs 46a, 46b which are respectively connected with the sections 44a, 44b to transmit signals which regulate the pressure at the outlets $L_1$ to $L_3$ and $L_4$ to $L_7$, respectively. The input 47 of the computer 45 receives signals which denote the actual pressure of fluid in spaced-apart portions of the nip 3, the input 48 of the computer 45 receives signals which denote the desired pressures in the spaced-apart portions of the nip 3, and the input 49 receives signals which denote the parameters of several longitudinally extending portions of the running web which advances through the nip 3. The manner in which the pressure in spaced-apart portions of the nip is measured is disclosed, for example, in U.S. Pat. No. 4,074,624. The manner in which a variable parameter of a running web is or can be monitored is also disclosed in U.S. Pat. No. 4,074,624. This patent further discloses a regulating unit (with a compensator) which can be used in conjunction with the roll 1.

The heat exchanger 43 is installed in a circuit 50 for a medium which exchanges heat with the fluid flowing from the pump 42 to the sections 44a, 44b of the pressure regulating unit 44. The circuit 50 includes a heater 51 which receives signals from a sensor 52 serving to monitor the temperature of pressurized fluid in the conduit connecting the heat exchanger 43 with the sections 44a and 44b. The heater 51 comprises means (not shown) for comparing the signals from the sensor 52 with signals from a preferably adjustable source of reference signals and for changing (raising or lowering) the temperature of heat exchange medium in the circuit 50 when the monitored value (sensor 52) deviates from the preselected (reference) value.

The assembly which includes the rolls 1 and 2 is further provided with a means 53 for monitoring the temperature of the external surface of the shell 4 at a plurality of locations intermediate the ends of the roll 1. The illustrated temperature monitoring means 53 comprises a sensor which is reciprocable in the axial direction of the roll 1 and transmits signals denoting the temperature of selected portions of the external surface of the shell 4 to the input 55 of the computer 45. The track along which the temperature monitoring means 53 is reciprocable is shown at 54. The input 55 actually admits signals to a compensator 56 which, in the embodiment of FIGS. 1 and 2, constitutes an element of the computer 45. The input 57 of the comparator 56 receives signals from a source 58 of reference signals denoting the desired temperature at predetermined longitudinally spaced-apart locations along the external surface of the shell 4. Reference may be had to commonly owned U.S. Pat. No. 4,498,383 which discloses a reciprocable temperature sensor as well as a set of stationary temperature sensors which can be utilized in lieu of the monitoring means 53.

The function of the compensator 56 (which is or can be a component of the computer 45) is to compare the actual (monitored) temperatures (monitoring means 53) at selected portions of the external surface of the shell 4 with the desired or optimum temperatures (source 58) and to enable the computer 45 to transmit signals which cause the sections 44a, 44b of the fluid regulating means 44 to alter (when necessary) the pressure of fluid in the outlets $L_1$ to $L_7$ so as to achieve a volumetric rate of fluid flow to the corresponding bearing elements 5 and 6 such as is necessary to increase or reduce the temperature at the corresponding portion or portions of the external surface of the shell 4. At the same time, the compensator 56 ensures that the changes of pressure of fluid which is conveyed to the bearing elements 5 and 6 (and more particularly to the pressure transmitting devices 14, 15 and 26, 27 of these bearing elements) are effected with a view to avoid any influencing of the flexure of the shell 4, i.e., to prevent the changes which are effected for the purpose of altering the temperature of certain portions of the external surface of the shell 4 from adversely influencing the pressure regulating action along the nip 3.

The just described function of the computer 45 and of its compensator 56 will be readily appreciated by referring to FIGS. 3 and 4. FIG. 3 shows a force P1 which a bearing element 5 applies in the common plane of the axes of the rolls 1 and 2 in a direction toward the nip 3 i.e., to counteract the force which acts upon the topmost portion of the roll 1. At the same time a secondary bearing element 6 applies a force P2 whose direction is diametrically opposite the force P1, i.e., which acts in the same direction as the force tending to move the roll 1 downwardly. The compensator 56 ensures that, for the purpose of properly heating or cooling selected portions of the peripheral surface of the shell 4, any change of the force P1 by a value $\Delta P$ is matched by an identical or substantially identical change of the force P2 (i.e., again by the value $\Delta P$). Consequently, the magnitude of the resulting force that acts upon the shell 4 remains unchanged. Such resulting force regulates the pressure in the nip 3.

FIG. 4 shows the transverse forces Q1 and Q2 which are generated by the pressure transmitting units 14, 15 of a bearing element 5 and act at right angles to the plane of the common axes of the rolls 1 and 2. The force Q1 acts in a direction to the left and the force Q2 acts in a direction to the right, as viewed in FIG. 2 or 4. If the pressure in the units 14, 15 of the bearing element 5 is changed, the magnitude of the force Q1 is changed by $\Delta Q$, i.e., by the same or nearly the same value as the magnitude of the force Q2. The resulting force remains unchanged. Thus, any pressure changes which are effected for the purpose of altering the temperature at one or more locations along the external surface of the shell 4 (considered in the axial direction of the roll 1) will not affect the force which is generated by the units 14, 15 of the respective bearing element 5 for the purpose of ensuring the establishment of predetermined pressure in the respective portion of the nip 3. The force Q1 equals or can equal the force Q2. The preceding explanations also apply for transverse forces which are generated by the units 26, 27 of the bearing elements 6.

FIG. 5 shows diagrammatically certain parts of a secondary bearing element 6 and the pressures which develop when the rate of fluid flow $\overset{\lor}{V}$ assumes a predetermined value. The reference character 59 denotes a pressure accumulator which is connected with the outlet $L_7$ of the section 44b. The pressure regulating unit 44 ensures that the pressure in the cylinder chamber 28 of FIG. 5 equals $p_o$ which, with the effective area of the respective pressure transmitting device 26, generates a predetermined force. The pressure of fluid flowing through the throttling passage 32 is reduced from $p_o$ to $p_2$ which, multiplied by the effective area of the respective pocket 34, generates a force P2 (see FIG. 3). The pressure of fluid is reduced from $p_2$ to that in the reservoir 41 during flow through the respective clearance or gap 36, i.e., from the pocket 34 into the space 21. The length of each throttling passage (18, 24, 32, 33) equals $L_D$, i.e., the length of each such passage is the same not only in the primary bearing elements 5 but also in the secondary bearing elements 6. However, the diameters of throttling passages (32, 33) in each bearing element 6 exceed the diameters of throttling passages (18, 24) in the bearing elements 5. The length $L_S$ of a gap 36 matches the length of a gap 20. The width of each of the gaps 20, 36 is selected automatically as a function of prevailing pressures in the respective pockets.

The throttling or flow restricting action of the passages 32, 33 and 18, 24 is preferably selected in such a way that the rate of fluid flow through a passage 32 or 33 is at least 1.5 times and preferably at least 2 times greater than the rate of fluid flow through a passage 18 or 24.

Figure 6:
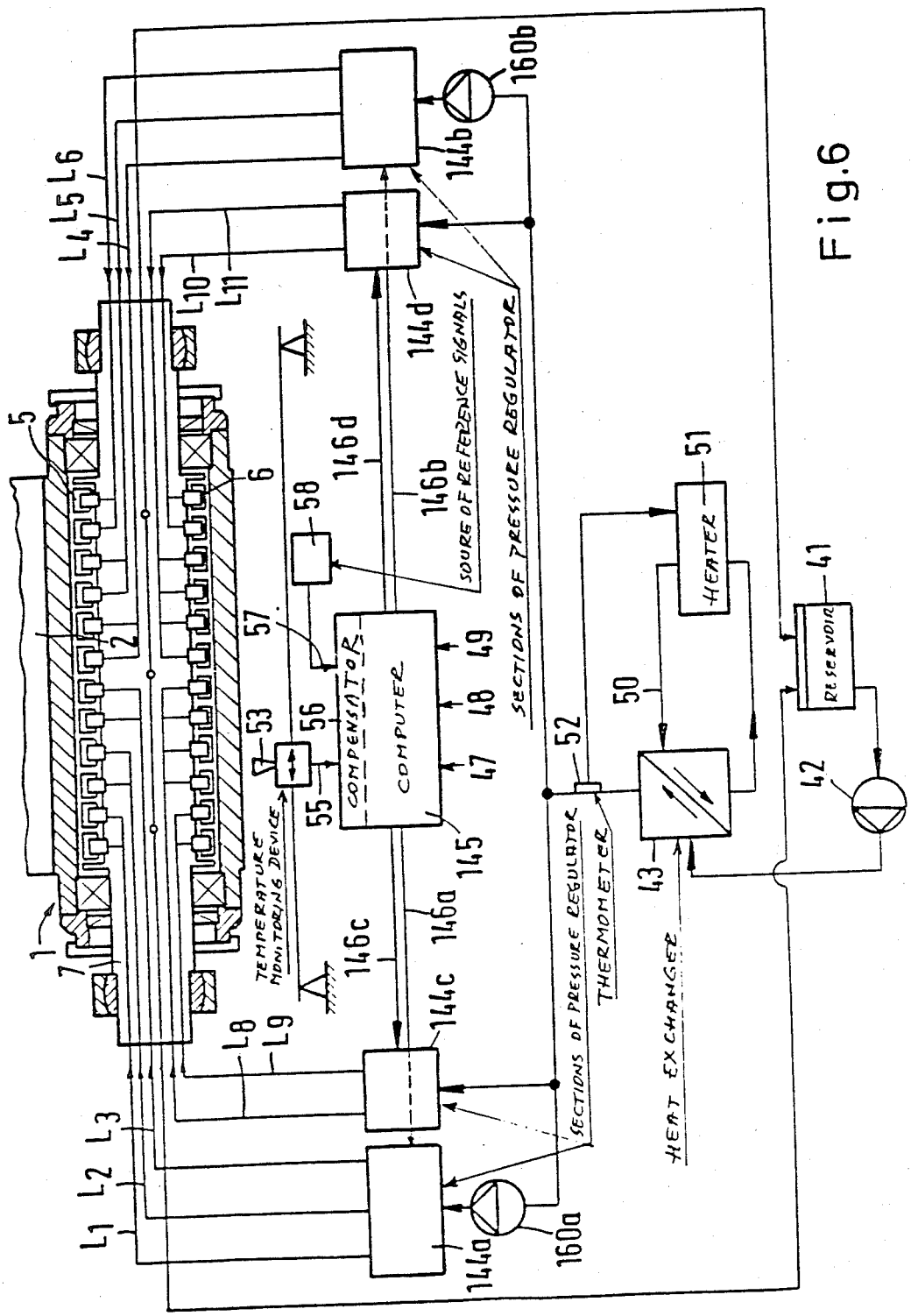
FIG. 6 is a view similar to that of FIG. 1 but showing a modified unit which regulates the pressure of fluid flowing to the primary and secondary bearing elements.

FIG. 6 shows a modified arrangement of rolls 1 and 2. Those parts of the modified arrangement which are identical with the corresponding parts of the arrangement of FIGS. 1-5 are denoted by the same reference characters and modified parts are denoted by similar reference characters plus 100. The main difference between the two arrangements is that the fluid pressure regulating unit of FIG. 6 comprises four sections 144a, 144b, 144c and 144d. The sections 144a, 144b regulate the pressure of fluid in the respective sets or groups of bearing elements 5 and supply fluid at a requisite pressure to the outlets $L_1$–$L_3$ and $L_4$–$L_6$, respectively. Each of these outlets admits pressurized fluid to a pair of neighboring bearing elements 5. The sections 144a, 144b are respectively connected with pressure increasing means in the forms of pumps 160a, 160b.

The sections 144c, 144d are connected with the corresponding groups of secondary bearing elements 6 and respectively comprise pairs of outlets $L_8$, $L_9$ and $L_{10}$, $L_{11}$ each of which supplies pressurized fluid to a set or group of two or four bearing elements 6, respectively, sometimes it is advantageous to use groups of secondary bearing elements 6 which have the same number of bearing elements as the opposite group of primary bearing elements 6. The computer 134 has four outputs 146a, 146b, 146c, 146d which are connected with the inputs of the respective sections 144a–144d. Each of these outputs can transmit appropriate signals for the regulation of fluid pressure in several bearing elements 5 or 6. The exact construction of the sections 44a, 44b and/or 144a–144d forms no part of the present invention. Such devices are well known in the relevant art. Reference may be had to the aforementioned patents.

The roll 1 of FIGS. 1 and 2 is relatively simple because all of the secondary bearing elements 6 receive pressurized fluid from a single conduit (outlet $L_7$ of the section 44a). This renders it possible to predictably change the temperature along the entire roll 1. The somewhat more complex roll of FIG. 6 exhibits the advantage that it allows for selective heating or cooling of several elongated sections of the shell 4 (namely adjacent to four different sets of secondary bearing elements, one set for each of the four outlets $L_8$ to $L_{11}$). It is further within the purview of the invention to select other combinations of outlets, for example, a discrete outlet for each primary and/or each secondary bearing element or discrete outlets for groups or sets each of which includes two or more primary bearing elements, two or more secondary bearing elements or one or more primary and one or more secondary bearing elements.

An important advantage of the improved roll 1 is that the means for regulating the pressure at several locations along the nip of the rolls 1 and 2 also serves as a means for selecting the temperature of the shell 4 at such locations. The compensator 56 ensures such distribution of fluid pressure changes among the bearing elements 5 and 6 that each change of the aforediscussed forces $P_1$ is matched by an equal change of the forces $P_2$. The temperature of a selected portion of the shell 4 is changed by changing the rate of fluid flow to thereby select the quantity of heat which is exchanged between the fluid and the shell. Another advantage of the improved roll is that the just discussed temperature change is effected by the unit which also regulates the pressure along the nip 3. Consequently, the improved roll can dispense with the aforediscussed auxiliary heating devices; it suffices to provide (if desired) some means for regulating the temperature of the fluid which flows toward the regulating unit. The compensator 56 cooperates with the secondary bearing elements 6 to ensure that flexing of the shell 4 (so as to select a desired distribution of pressures along the nip 3) is not influenced by those changes in the rate of fluid flow to the bearing elements which are selected with a view to ensure the establishment of a satisfactory pattern of temperatures along the nip. Since the shell 4 invariably contacts the tempered fluid at two or more locations, a relatively large quantity of fluid is available for the exchange of heat. If the roll 1 is provided with a heating device, hydraulic fluid which is supplied to the bearing elements 5 and 6 can be maintained at a relatively low temperature. In the absence of such heating device, the fluid which is supplied to the bearing elements can be heated to the maximum permissible temperature (because no additional heating takes place in the shell) so that it is then possible to transfer to the shell very large quantities of heat.

The utilization of bearing elements each of which comprises several pressure transmitting units is desirable and advantageous because this renders it possible to counteract external transverse forces. As described in connection with FIG. 4, the compensator 56 distributes those pressure changes which are necessary to change the rate of fluid flow among the bearing elements 5 and 6 in such a way that each change of the force $Q_1$ brings about an equal change of the force $Q_2$. The number of pressure transmitting units in some or all of the bearing elements 5 and/or 6 can be increased to three or even more; this results in an increase of that area of the internal surface of the shell 4 which is supported or acted upon by the bearing elements and, consequently, an increase of the area of contact between the tempered hydraulic fluid and the shell. In addition to cooperating with the compensator 56 for the aforediscussed purposes, the secondary bearing elements 6 perform a standard or normal supporting function and thus stabilize the shell. The stabilizer 56 ensures that the stabilizing action of the forces $Q_1$ and $Q_2$ is not adversely influenced during regulation of the temperature at one or more locations along the nip 3.

The placing of the rows of primary and secondary bearing elements into a common plane (diametrically opposite each other with reference to the axis of the shell 4) is desirable and advantageous because this allows for more accurate and simpler regulation of the magnitude of forces $P_1$ and $P_2$ for the purpose of conforming the distribution of pressures along the nip 3 to a predetermined pattern. It has been found that the illustrated construction and distribution of primary and secondary bearing elements (each of which has two pressure transmitting units) so that each primary bearing element is disposed diametrically opposite a secondary bearing element is particularly satisfactory for the establishment of heat transfer to or from a large portion of the internal surface of the shell 4 as well as for pronounced stabilization of the position of the shell 4 with reference to the carrier 7 and the roll 2. Moreover, the roll 1 can employ a relatively simple compensator irrespective of the fact that such compensator must regulate the forces $P_1$, $P_2$ as as well as the forces $Q_1$, $Q_2$.

The aforediscussed selection of diameters of the throttling passages 18, 24 and 32, 33 ensures that a larger quantity of fluid flows through the secondary bearing elements 6 even though (as a rule) the pressure in the cylinder chambers and pockets of the pressure transmitting units 26, 27 is lower than in the cylinder chambers and pockets of the pressure transmitting units 14, 15. Large quantities of hydraulic fluid can be caused to flow through the pressure transmitting units 26 and 27 if the relationship of throttling action in the units 14, 15 to the throttling action in the units 26, 27 is such that the rate of fluid flow through the bearing elements 6 is at least 1.5 times but preferably at least two times the rate of fluid flow through the bearing elements 5. This allows for the transfer of large quantities of heat between the fluid flowing through the secondary bearing elements 6 and the shell 4. The fact that this may result in a slight increase of the width of the gaps 36 (as compared with the width of the gaps 20) is of no consequence since the forces ($P_2$ and $Q_2$) which are applied by the secondary bearing elements 6 are relatively small. Furthermore, the just discussed design of the secondary bearing elements 6 renders it possible to change the temperature of the shell 4 in response to relatively small changes in the rate of fluid flow through the pressure transmitting units 26 and 27. This, in turn, entails relatively small changes of pressure of the fluid flowing through the pressure transmitting units 14, 15 of the primary bearing elements 5.

The feature that the diameters of throttling passages 32, 33 exceed the diameters of throttling passages 18, 24 is desirable on the additional ground that, all other things being equal, the rate of fluid flow changes with the fourth power of the diameter of the throttling passage. Thus, it is possible to establish and maintain pronounced differences between (a) the resistance which the fluid encounters during flow from the cylinder chambers 16, 22 to the pockets 19, 25 and (b) the resistance which the fluid encounters during flow from the cylinder chambers 28, 29 to the respective pockets 34, 35.

The source 58 of reference signals for the compensator 56 can be calibrated on the basis of experiments or its reference signals can be selected as a function of changes in one or more variable parameters, e.g., smoothness, thickness, gloss and/or other characteristics of the running web. The incorporation of the compensator 56 into the computer 45 or 145 results in a simplification of the regulating unit and ensures simultaneous determination of pressures which are to be applied by the pressure transmitting units as well as of pressure changes and distribution of pressure chantes in order to influence the temperature at selected locations along the nip.

The provisions of pumps 160a, 160b is desirable on the ground that, as a rule, the pressure of fluid in the outlets $L_1$–$L_6$ is higher than the pressure of fluid in the outlets $L_8$–$L_{11}$.

| The following items could preferably be used: | |
|---|---|
| | producer and type: |
| Computer 45 or 145 compensator 56 | Firma Modikon Automatisierungssysteme Kothener Str. 1 D-5600 Wuppertal type: SBS 484 |
| pressure regulator units 44a–44b, or 144a–d | Regeltechnik Kornwestheim GmbH Postfach 1423 D-7014 Kornwestheim type: RE 3402 |
| heater 51 | Gesellschaft fur Warme- und Kaltetechnik GmbH D-5883 Kierspe/Sauerland type: 1o7o53oo |

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A pressure applying roll for use in calenders and analogous machines to define with a complementary roll a nip for the passage of running paper webs and the like, comprising a hollow flexible rotary cylindrical shell; an elongated carrier extending through and spacedly surrounded by said shell; hydrostatic bearing means interposed between said shell and said carrier and including at least one row of first fluid-operated bearing elements extending longitudinally of said carrier and arranged to apply to said shell a first substantially radial force acting in a first direction, and at least one row of second fluid-operated bearing elements extending longitudinally of said carried and arranged to apply to said shell a second substantially radial force having a component acting in a second direction counter to said first direction; a source of pressurized hydraulic fluid including means for tempering the fluid; means for conveying pressurized fluid from said source to said bearing elements including means for altering the rate of fluid flow to said bearing elements as a function of pressure changes, comprising compensator means operative to distribute said pressure changes among said first and second bearing elements so that the resulting changes of said first force match or closely approximate the resulting changes of said second force; and means for monitoring the temperatures of said shell at a plurality of locations longitudinally of the nip of the rolls and for transmitting to said compensator means first signals denoting the temperatures of the shell at said locations, said compensator means including means for comparing such first signals with second signals denoting the desired temperatures of the shell at said locations and said compensator means being arranged to alter the rate of fluid flow to bearing elements independtly of the nip pressure adjacent those locations where the monitored temperatures deviate from desired temperatures.

2. The roll of claim 1, wherein each of said bearing elements comprises a plurality of pressure transmitting units adjacent each other in the circumferential direction of said shell so that each of said bearing elements further applies to said shell oppositely directed transverse forces acting at right angles to said first force, said compensator means having means for distributing said pressure changes among said first and second bearing elements so that the resulting changes of one of said oppositely directed transverse forces at least approximate the resulting changes of the other of said oppositely directed transverse forces.

3. The roll of claim 1, wherein each of said first bearing elements is disposed substantially diametrically opposite one of said second bearing elements with reference to the axis of said shell.

4. The roll of claim 3, wherein each of said bearing elements comprises two pressure transmitting units disposed at the opposite sides of a symmetry plane including the axis of said roll.

5. The roll of claim 1, wherein said conveying means comprises an outlet connected to all of said secondary bearing elements.

6. The roll of claim 1, wherein said second bearing elements together form a plurality of groups and said conveying means comprises a plurality of outlets, one for each of said groups.

7. The roll of claim 1, wherein each of said bearing elements comprises at least one pressure transmitting unit having a throttling passage for the flow of pressurized fluid, the resistance of throttling passages in the pressure transmitting units of said first bearing elements to the flow of fluid being greater than the resistance of throttling passages in the pressure transmitting units of said second bearing elements.

8. The roll of claim 7, wherein the parameters of said throttling passages are such that the rate of fluid flow through the passages of pressure transmitting units of said second bearing elements is at least 1.5 times the rate of fluid flow through the passages of pressure transmitting units of said first bearing elements.

9. The roll of claim 7, wherein the parameters of said throttling passages are such that the rate of fluid flow through the passages of pressure transmitting units of said second bearing elements is more than twice the rate of fluid flow through the passages of pressure transmitting units of said first bearing elements.

10. The roll of claim 1, wherein each of said bearing elements comprises at least one pressure transmitting unit having a throttling passage for the flow of pressurized fluid, the cross-sectional areas of throttling passages in the pressure transmitting units of said second bearing elements being greater than the cross-sectional areas of throttling passages in the pressure transmitting units of said first bearing elements.

11. The roll of claim 1, wherein said carrier has a plurality of channels for circulation of fluid to and from said bearing elements.

12. The roll of claim 1, wherein said conveying means comprises a computer.

13. The roll of claim 12, wherein said comparator means is an element of said computer.

14. The roll of claim 1, further comprising means for increasing the pressure of fluid flowing to said first bearing elements.

15. The roll of claim 14, wherein said pressure increasing means comprises a plurality of pumps each arranged to deliver pressurized fluid to a set of first bearing elements.

16. The roll of claim 1, wherein the number of first bearing elements matches the number of second bearing elements.

17. The roll of claim 1, wherein said source comprises a reservoir and means for supplying leak fluid from the interior of said shell to said reservoir, said conveying means comprising conduit means connecting said reservoir with said conveying means and a fluid flow machine in said conduit means said tempering means comprising a heat exchanger installed in said conduit means downstream of said fluid flow machine.

18. The roll of claim 1, wherein said conveying means comprises a plurality of discrete sections and each of said sections includes means for regulating the pressure of fluid flowing to a predetermined number of first bearing elements.

19. The roll of claim 18, wherein said conveying means includes a plurality of first sections each arranged to regulate the pressure of fluid flowing to a predetermined number of first bearing elements and at least one second section arranged to regulate the pressure of fluid flowing to said second bearing elements.

* * * * *

UNITED STATES PATENT AND TRADEMARK OFFICE
CERTIFICATE OF CORRECTION

PATENT NO. : 4,729,153

DATED : March 8, 1988

INVENTOR(S) : Josef PAV et al.

It is certified that error appears in the above-identified patent and that said Letters Patent are hereby corrected as shown below:

FOREMOST PAGE [73] Assignee: after "Kleinewefers GmbH" delete the "," and add --and Ramisch Kleinewefers GmbH, both--.

Signed and Sealed this

Seventh Day of February, 1989

*Attest:*

DONALD J. QUIGG

*Attesting Officer*　　　　*Commissioner of Patents and Trademarks*